No. 763,653. PATENTED JUNE 28, 1904.
J. A. BAILEY.
BAKE PAN.
APPLICATION FILED AUG. 26, 1903.
NO MODEL.
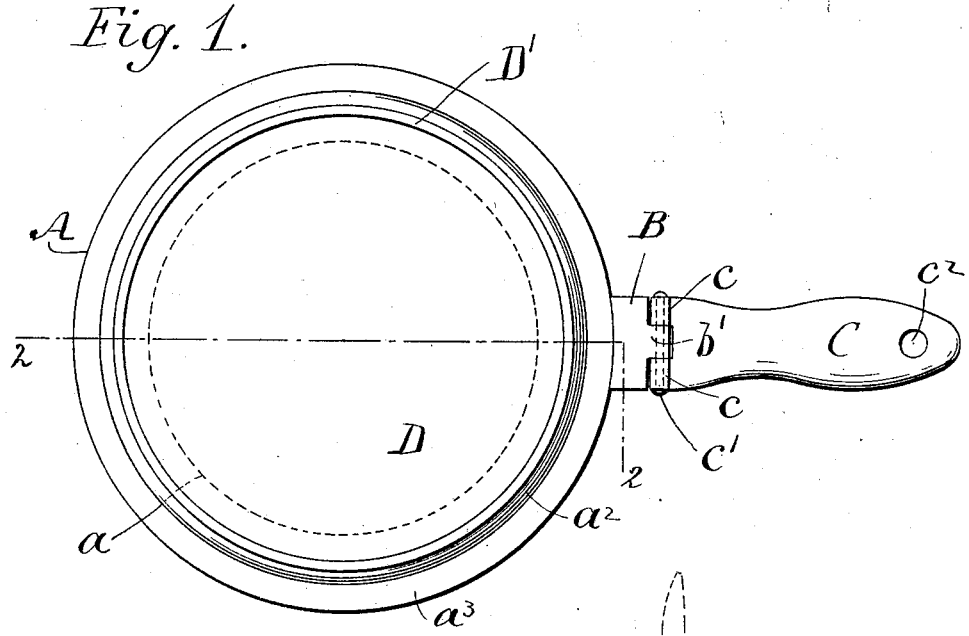
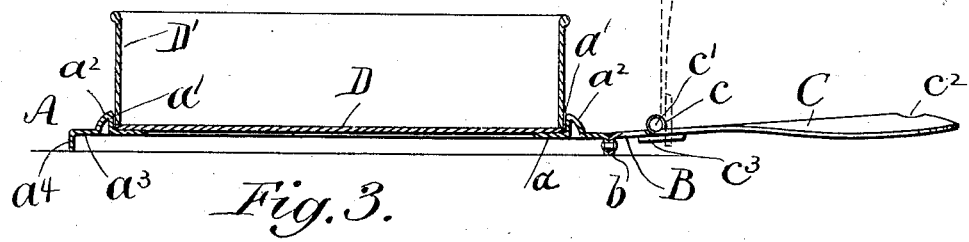
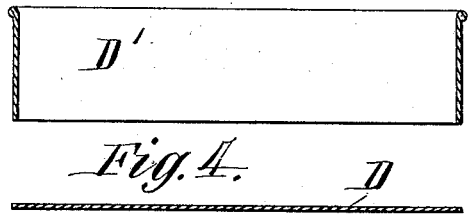
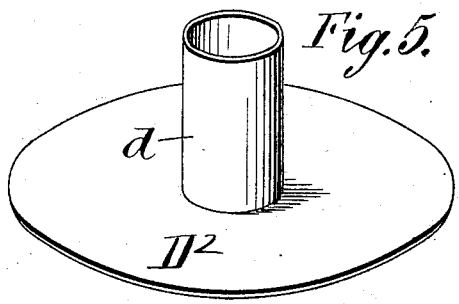
WITNESSES:
B. Patterson
M. Lynch
INVENTOR
Jeanne A. Bailey
BY
Clar Deemer
ATTORNEYS.

No. 763,653.

Patented June 28, 1904.

UNITED STATES PATENT OFFICE.

JEANNE A. BAILEY, OF BROOKLYN, NEW YORK.

BAKE-PAN.

SPECIFICATION forming part of Letters Patent No. 763,653, dated June 28, 1904.

Application filed August 26, 1903. Serial No. 170,769. (No model.)

*To all whom it may concern:*

Be it known that I, JEANNE A. BAILEY, a citizen of the United States, and a resident of Brooklyn, county of Kings, and State of New York, have invented certain new and useful Improvements in Bake-Pans, of which the following is a specification, reference being had to the accompanying drawings, forming a part thereof, in which similar letters of reference indicate corresponding parts.

The subject of the present invention is a bake-pan more particularly designed for baking cake, and has for its primary object a simple, convenient, and efficient arrangement whereby when the baking operation is completed the satisfactory removal of the cake will be greatly facilitated and in a manner whereby an independent base may be employed in a succeeding baking operation without loss of time.

With the above purposes in view the novel bake-pan comprises generally an independent base, preferably provided with a handle, and a pan proper, including a bottom and rim relatively separable, said pan being adapted for mounting on the base, whereby at the termination of the baking operation the entire device can be removed from the oven and inverted to suitably deposit the pan, with its contents, so that a knife-blade can be introduced and manipulated to release the bottom of the cake from the pan-bottom, whereupon the latter can be removed from the filled rim, after which said blade can be introduced and moved around between the inner side of the rim and the contained cake to release the latter from the rim and permit the dumping of the cake therefrom in perfect condition. Immediately after the depositing of the pan proper, as referred to, and before the cake-releasing operations set forth the base may have a similar pan mounted thereon, but containing cake-dough, and the device thus constituted introduced within the oven, so that the operation of baking a further cake can be proceeded with without loss of time.

In the accompanying drawings, forming part of this specification, Figure 1 is a plan view of a bake-pan embodying my invention and representing the same conditioned for receiving the dough prior to the introduction of the pan within the oven. Fig. 2 is a vertical sectional view of the parts disclosed in Fig. 1, the plane of the section being indicated by the broken line 2 2 of said latter figure. Figs. 3 and 4 are detail sectional views of the parts composing the pan proper. Fig. 5 is a perspective view of a modified form of pan-bottom.

As disclosed, the novel bake-pan is shown as being embodied in a type adapted for baking circular cakes. The said pan comprises an annular or ring base A, preferably of sheet metal and presenting an inner horizontal ledge $a$, a shoulder with vertical inner face $a'$ and outer rounded portion $a^2$, the latter merging in a horizontal margin $a^3$, with turned-down flange $a^4$, forming a rest for the ring.

Externally riveted to the flange $a^4$, at one point thereof, is the turned-down portion $b$ of a short horizontal plate B, the outer end part of which is of reduced character and curled to constitute the stationary butt $b'$ of a hinge. The inner recessed portion of a handle C embodies tongues which are turned to constitute the embracing-butt $c$ of the hinge, pivotally connected to the butt $b'$ by a pintle $c'$. For the sake of lightness this handle is preferably constructed of sheet metal, and it is transversely arched to a slight extent for a considerable part of its length for securing strength as well as affording a comfortable grasp. A small perforation $c^2$ in the handle near its outer end permits the handle and connected parts to be hung at any suitable point when required. At the under side of the handle and near its hinge-joint is secured a small stop $c^3$, adapted to contact with the lower face of the plate B, and thereby limit the handle from swinging downward beyond the horizontal position. (Indicated in full lines in Fig. 2.)

D designates the independent circular bottom of the pan proper. This bottom is of a diameter adapting it for being placed to rest upon the ledge $a$, with the periphery of said bottom in bearing contact with the base-shoulder. The circular vertical rim D' is adapted to be supported upon the bottom, with its lower part snugly confined by the shoulder.

From the description thus far it will be readily comprehended that with the several parts associated as illustrated in Figs. 1 and 2 the dough can be introduced within the pan proper provided by the bottom and rim and the entire device then raised by the handle and placed within the oven, after which the handle can be raised to the dotted position (indicated in Fig. 2) to render the device compact within the oven and admit the objectionable disposition of the handle. When the baking operation has been completed, the handle is swung down and the entire device removed from the oven, whereupon said device can be inverted to deposit the cake-containing pan-top downward upon a suitable plate or other surface. Another bottom and rim can then be quickly adjusted within the ring and dough introduced within the pan and a further cake baked, as before, these operations being repeated according to the number of cakes desired. When each cake-containing pan has been deposited in an inverted position, a knife-blade is introduced between the pan bottom and rim and so manipulated as to release the bottom from the cake. The blade is then introduced between the rim and cake to detach the latter, whereupon the same can be suitably dumped.

The bottom may be conditioned to meet special requirements of the baking operation. For instance, if it be desired to bake a cake having a familiar vertical opening then a bottom $D^2$, Fig. 5, having centrally an upper vertical tube $d$, can be employed.

As before intimated, the device is light, simple, extremely useful, and comparatively inexpensive.

I do not desire to be understood as limiting myself to the precise details and arrangements of parts shown and described, but reserve the right to all modifications as may be considered within the scope of my invention.

Having now described my invention, what I claim as new, and desire to secure by Letters Patent, is—

1. A bake-pan comprising a relatively separable bottom and rim, and provision including an upwardly-swinging handle for conjointly inverting the same.

2. A bake-pan comprising a relatively separable bottom and rim, and provision for conjointly inverting the same and including an upwardly-swinging handle, and a stop for limiting the downward movement of the handle.

3. A bake-pan comprising a base having an upper vertical shoulder, inner ledge and supporting-flange, an independent bottom for resting on said ledge, and peripherally bearing against the shoulder, and a rim for resting on the bottom and confined by the shoulder.

In testimony that I claim the foregoing as my invention I have signed my name, in presence of two witnesses, this 25th day of August, 1903.

JEANNE A. BAILEY.

Witnesses:
  B. PATTERSON,
  M. LYNCH.